United States Patent
Grundemann et al.

(10) Patent No.: US 9,049,273 B2
(45) Date of Patent: Jun. 2, 2015

(54) SELECTIVE NETWORK TRANSMISSION

(75) Inventors: Christopher Grundemann, Castle Rock, CO (US); Karthik Sundaresan, Boulder, CO (US); Vikas Sarawat, Broomfield, CO (US); Christopher J. Donley, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 585 days.

(21) Appl. No.: 13/372,892

(22) Filed: Feb. 14, 2012

(65) Prior Publication Data

US 2013/0212299 A1 Aug. 15, 2013

(51) Int. Cl.
G06F 15/16 (2006.01)
H04L 29/12 (2006.01)
H04L 12/781 (2013.01)

(52) U.S. Cl.
CPC ............. H04L 61/6077 (2013.01); H04L 45/52 (2013.01); H04L 61/2546 (2013.01); H04L 61/2514 (2013.01)

(58) Field of Classification Search
CPC ....... H04L 45/52; H04L 45/74; H04L 45/741; H04L 69/167; H04L 12/4633
USPC ................. 709/227–228, 236, 245–246, 249; 370/252
See application file for complete search history.

(56) References Cited

U.S. PATENT DOCUMENTS

| | | | | |
|---|---|---|---|---|
| 7,334,049 | B1* | 2/2008 | Somasundaram et al. | 709/245 |
| 7,657,642 | B2* | 2/2010 | Blanchet | 709/230 |
| 8,498,295 | B1* | 7/2013 | Saxena et al. | 370/392 |
| 2006/0233175 | A1* | 10/2006 | Ge et al. | 370/392 |
| 2011/0110375 | A1* | 5/2011 | Boucadair et al. | 370/393 |

OTHER PUBLICATIONS

Bovy, Fred, "Transition to IPv6 at the Service Providers", Aug. 19, 2011, fastlaneus.com [online], [retrieved on Jul. 25, 2014]. Retrieved from the Internet <URL: http://www.fastlaneus.com/blog/2011/08/19/transition-to-ipv6-at-the-service-providers-nat64-6rd-ds-lite-6pe-6vpe-and-carrier-grade-ipv6-cgv6/comment-page-1/>.*

* cited by examiner

*Primary Examiner* — Brian J Gillis
*Assistant Examiner* — Austin Moreau
(74) *Attorney, Agent, or Firm* — Great Lakes Intellectual Property, PLLC.

(57) ABSTRACT

Network transmission of messages is contemplated. The contemplated transmission may be facilitated with a selectable one or more interfaces. The interfaces may be included as part of a gateway or other device tasked with facilitating network communications, such as but not limited to a gateway tasked with facilitate network transmissions between device connected to a home network and devices connected beyond the home network.

3 Claims, 3 Drawing Sheets

SELECTIVE NETWORK TRANSMISSION

TECHNICAL FIELD

The present invention relates to facilitating network transmission with the use of one or more of a plurality of interfaces, such as but not limited to selectively arbitrating use of the plurality of interfaces depending on a network destination of message.

BACKGROUND

Internet Protocol (IP) is a computer network protocol (analogous to written and verbal languages) that all machines on the Internet must know in order to communicate with one another, i.e., IP is a layer 3 (network layer) protocol in the Open Systems Interconnection (OSI) model. The vast majority of IP devices support IP version 4 (IPv4) defined in RFC-791, the disclosure of which is hereby incorporated by reference in its entirety, and IP version 6 (IPv6) defined in RFC-2460, the disclosure of which is hereby incorporated by reference in its entirety. Devices relying on IP may be assigned an IP address (e.g., an IPv4 and/or an IPv6 address). The IP address and/or other addresses assigned to the IP and non-IP devices (MAC address, etc.) may be designated as being globally and/or locally unique addresses depending on whether the address is limited to uniquely identify a device on a private or inside network or whether the address is able to uniquely identify the device on the Internet or other global/public network.

A globally unique address may be assigned by a global tracking entity or other regulatory entity responsible for ensuring addresses are assigned to no more than one device. The global tracking entity may make this determination of global uniqueness based on all devices requesting or being allocated addresses for use over the Internet or other global/public network. A locally unique address, in contrast, may be assigned by a network administrator or other device tasked with ensuring addresses uniqueness across a more limited environment, such as over a local or private network that is independent of the Internet or other global/public network for which the globally unique addresses are assigned. Networks relying on locally unique addresses may be referred to as inside networks and the addresses relied upon to communicate over the network may be referred to as insides addresses. Similarly, the Internet or other global/public network may be referred to as outside networks and the addresses relied upon to communicate over the network may be referred to as outside addresses.

Devices connected to an inside network, referred to as inside devices, may rely upon inside addresses when addressing messages for communication with other similarly connected inside devices. The inside devices, however, may require an outside addresses in order to properly communicate with devices connected to the outside network, referred to as outside devices. This may be required since the assigned inside addresses may not uniquely identify the inside devices over the outside network (i.e., in the event the inside address is used by another outside device, messages specifying the inside address and intended for the inside address would be undesirably transmitted to the outside device). The required use of inside and outside addresses can become problematic in some case where there is a possibility that the number of inside addresses may exceed the number of outside address. Accordingly, a need exists to facilitate administration of the outside addresses, and in particular, avoiding consumption of the outside addresses if possible.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
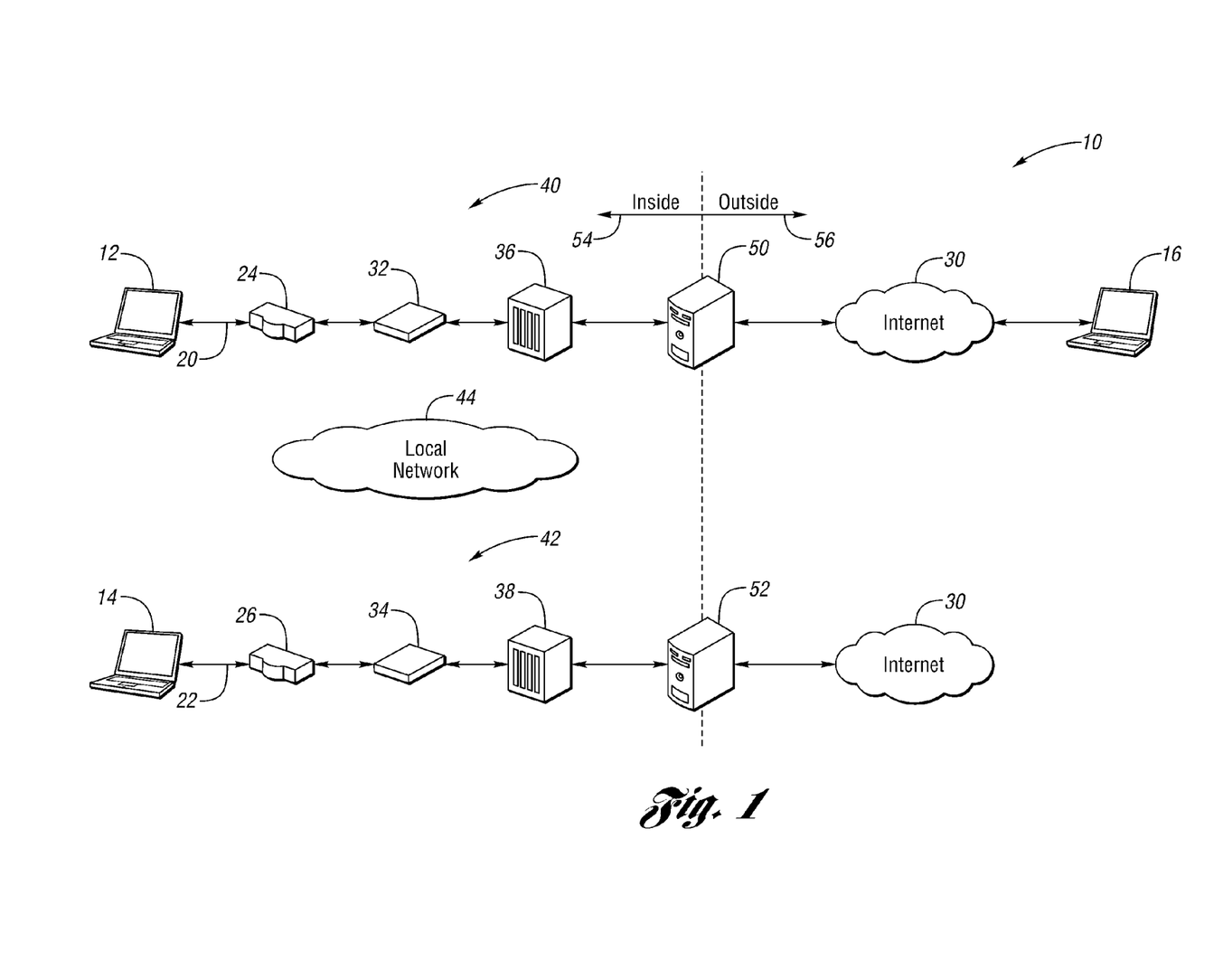
FIG. 1 illustrates a system configured to facilitate network transmissions in a manner contemplated by one non-limiting aspect of the invention.

FIG. 1 illustrates a system 10 configured to facilitate network transmissions in a manner contemplated by one non-limiting aspect of the invention. The system 10 is predominately described with respect to facilitating forwarding of messages or other data packets used to establish connections or other communications between a first device 12 and one or more of a second device 14 and a third device 16. The system 10 is illustrated with respect to a cable communications system where a cable television service provider or other service provider relies upon a cable infrastructure to facilitate network transmissions. This is done for exemplary non-limiting purposes as the present invention fully contemplates facilitating network transmissions over any type of or combination of wireless and/or wireline networks, including but not limited to optical networks, Wi-Fi networks, and/or cellular networks.

The first and second devices 12, 14 may be associated with corresponding first and second home networks 20, 22. The networks 20, 22 may be associated with a home of respective first and customers, or other entity, such as an office or place of business, where the corresponding local network 20, 22 is supported by a corresponding one of a first and second gateway 24, 26. The first and second gateways 24, 26 may be routers or other router-type devices configured to facilitate local wireless or wireline network through which the first and second devices 12, 14 communicate. The third device 16 may be connected to the Internet 30 in this manner through another Gateway (not shown) or through another network connection medium. While the gateways 24, 26 associated with the first and second devices 12, 14 are shown to support communications with only one illustrated device, the present invention fully contemplates each of the gateways 24, 26 operating to support any number of locally connected devices.

The first and second gateways 24, 26 are shown to be separate from a corresponding first and second cable modem (CM) 32, 34 or other modem configured to facilitate network communications with a corresponding first and second cable modem termination station (CMTS) 36, 38. The first and second CMs 32, 34 and CMTSs 36, 38 are described and illustrated since these components are common elements associated with cable infrastructure through which high-speed data communications are conducted. The present invention, however, fully contemplates the use of other mediums, devices, and infrastructure to facilitate data communications, including those associated with non-high-speed data communications. The system 10 contemplates the first device 12, the first gateway 24, the first CM 32332, and the first CMTS 36, collectively referred to as first service group 40, being associated with a different geographical area or service entity relative to the second device 14, the second gateway 26, the second CM 34, and the second CMTS 38, collectively referred to as a second service group 42. The first and second service groups 40, 42 may collectively form a local or internal network 44, which may be of any suitable wireless and/or wireline configuration.

Communications between the first and second service groups 40, 42 and the Internet 30 may be facilitated with a corresponding one of a first translation device 50 and a second translation device 52. The first and second translation devices 50, 52 may be configured to facilitate address translations operations necessary to permit messages to be forwarded between the respective service groups 40, 42 and the Internet 30. The translation devices 50, 52 may be a network address translator (NAT), a carrier grade NAT (CGN), a 6RD device, an AFTR device or other device capable of network address translation. Optionally, the translation devices 50, 52 may be configured to facilitate operations associated with one or more of the NAT, CGN, 6RD, or AFTR devices such that the same translation device 50, 52 is able to simultaneously support multiple operations and protocols. Of course, the present invention is not necessarily limited to the translation devices 50, 52 having capabilities to support multiple operations and fully contemplates the translation devices 50, 52 comprising multiple, separate devices capable of performing the noted functions.

The first and second translation devices 50, 52 may be used to demarcate an inside 54 and an outside 56 of the system 10. The inside designation 54 may correspond with a portion of the system 10 over which inside addresses may be sufficient to facilitate communications. The inside addresses may be assigned to be unique within the inside portion 54 of the system 10 assigned by the first and second gateways 24, 26, or other device associated with the inside portion, e.g., a dynamic host configuration protocol (DHCP) server. The inside addresses may be sufficient to facilitate message communications between any device connected to the inside portion 54 of the system 10 (including those which are not specifically illustrated), at least as long as the corresponding messages are not required to be communicated beyond the inside portion 54 to the outside portion 56, i.e., the Internet 30 or other public network (not shown) or other location where a public or globally unique address may be required.

In the event the devices 12, 14 connected to the inside portion 54 desire or require communications with devices 16 connected to the outside portion 56, those communications, or more specifically the messages used to facilitate establishing the associated communications/connections, may require some translation between inside addresses and outside addresses, i.e., the addresses used on the inside portion 54 and the outside portion 56 of the system. Accordingly, the translation devices 50, 52 may be configured to facilitate the necessary translation of inside and outside addresses. The translation devices 50, 52 may not necessarily need to translate each inside address to an outside address if the inside address is globally unique. The present invention contemplates one or more of the inside devices having inside addresses that are globally unique, referred to as public addresses, in the event it is desirable for those certain devices to directly communicate with outside portion of the system, i.e., without having to rely upon the translation devices 50, 52.

The translation devices 50, 52 may be used in the event the number of public addresses are limited, which is particularly prevalent with IPv4 addresses, in order to allow private addresses to be used within the inside portion 54 without having to have the global uniqueness of public addresses. The translation devices 50, 52 may be configured to allow greater number of private addresses to be translated relative to a lesser number of public addresses in order to increase the number of available addresses that can be used on the inside portion 54 without those addresses having to be globally unique. As noted above, the translation devices 50, 52 may be comprised of one or more of the NAT, CGN, 6RD, or AFTR devices. These translation devices 50, 52 may have different communication requirements, messaging necessities, and/or protocol requirements in order to facilitate proper processing of the messages requiring network address translation. One non-limiting aspect of the present invention contemplates configuring the gateways 24, 26 with a plurality of interfaces where the interfaces are configured to facilitate interfacing messages with the translation devices 50, 52 according to the type of translation device 50, 52 being used to facilitate the network address translation.

Figure 2:
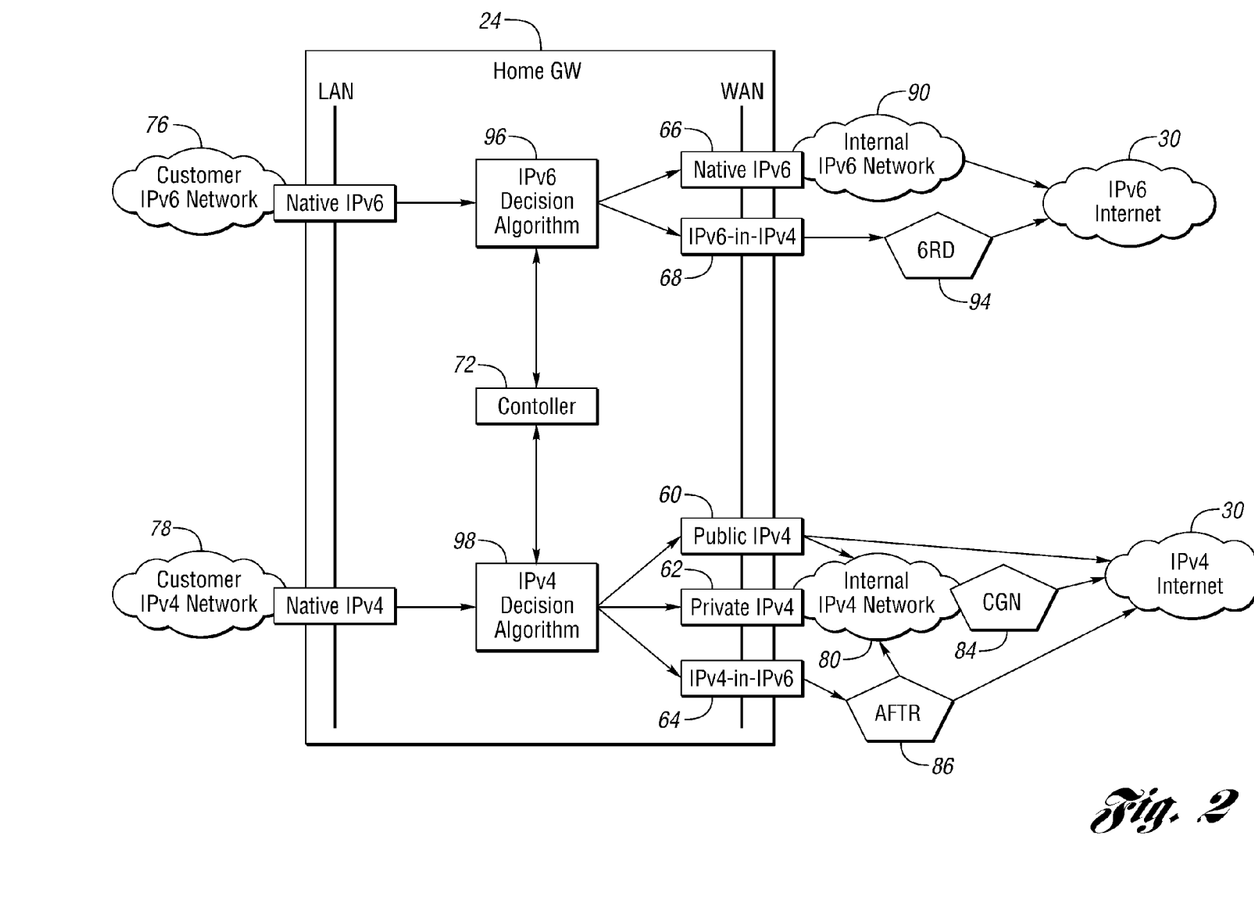
FIG. 2 illustrates a gateway as contemplated by one non-limiting aspect of the present invention.

FIG. 2 illustrates the gateway 24 as contemplated by one non-limiting aspect of the present invention. The gateway 24 may be configured to include a public IPv4 interface 60, a private IPv4 interface 62, Dual Stack Lite (DS-Lite) interface 64, a native IPv6 66, and/or a 6RD interface 68 with each interface being configured to facilitate message forwarding related operations. The gateway 24 is described with respect to including each of the noted interfaces, however, the present invention fully contemplates the gateway 24 including some number less than each of the illustrated interfaces 60, 62, 64, 66, 68. The interfaces 60, 62, 64, 66, 68 may be configured to facilitate processing of messages through the gateway 24 according to whether the gateway 24 will be forwarding the messages to the translation device 50 and/or directly to the destination, i.e., without forwarding to the translation device 50 for network address translation. The gateway 24 may include a controller 72 or other processing element having capabilities sufficient to select the network interface 60, 62, 64, 66, 68 used to forward a message depending on the particular network address translation requirements of the to be forwarded message.

The gateway 24 may be considered to be a universal gateway having capabilities to support IPv6 and IPv4 communications over corresponding IPv6 and IPv4 home networks 76, 78, which may be part of network 20. This is done for exemplary non-limiting purposes as the present invention fully contemplates the gateway 24 including fewer capabilities than those illustrated. The gateway 24 is so illustrated as the universal configuration may be particularly beneficial in environments where a service provider or other system operator associated with supporting operations of the system 10 may include infrastructures for separately supporting IPv6 and IPv4 communications. This infrastructure dichotomy may be particularly prevalent as service providers transition their network infrastructures from IPv4-based infrastructures to IPv6-based infrastructures and/or while service providers are tasked with simultaneously supporting some services over IPv4-based infrastructures while serving other services over IPv6-based infrastructures.

The public IPv4 interface 60 maybe assigned a public IPv4 address to facilitate messaging over IPv4-based infrastructures. The public IPv4 address may be sufficient to facilitate direct IPv4 communications to a destination without requiring network address translation. The message to be forwarded may include a source address (e.g. the address of the device connected to a home/customer IPv4 network 78 and a destination address of the device intended to receive the message). The public IPv4 interface 60 may be configured to translate the source address to the public IPv4 address and to maintain the destination address. The message may then be forwarded by the interface 60, in either of an upstream or downstream direction, between the IPv4 home network 78 and/or an internal IPv4 network 80, which may be part of network 44, and/or the IPv4 Internet 30 depending on whether the destination address corresponds with a device connected to the internal IPv4 network 80 or the IPv4 Internet 30. The internal IPv4 network 80 may be a network included on the inside 54 of the system 10 and IPv4 Internet 30 may be part of the Internet 30 on the outside 56. Because the messages forwarded through the public IPv4 interface 60 do not require network address translation and are therefore forwarded away from the transition devices 84, 86, it may be preferable to rely upon the public IPv4 interface when available.

When the public IPv4 interface 60 is unavailable or otherwise not desired, the private IPv4 interface 62 may be used. The private IPv4 interface 62 may be assigned a private IPv4 address. The private IPv4 address may be sufficient to facilitate communications over the internal IPv4 network 80 but insufficient to facilitate communications over the IPv4 Internet 30 without address translation being performed by a transition device 84. The private IPv4 interface 62 may be configured to replace the source address of the forwarded message with the private IPv4 address and to maintain the destination address. In the event the destination address is associated with a device 14 on the inside 54 of the system, e.g., the internal IPv4 network 80, the message may be forwarded directly to that device 14. In the event the destination address is associated with a device 16 on the outside of the system, e.g., the IPv4 Internet, the message may be forwarded to the translation device 84. The translation device 84 may be a CGN having a pool of public IPv4 addresses and configured for translating the private IPv4 source address to one of the public addresses IPv4 addresses available within the pool prior to forwarding the message to the Internet 30.

The DS-Lite interface 64 may be an alternative interface to the private IPv4 interface 62 in some environments where it may be desirable to rely upon a tunnel to facilitate communications with a translation device 86. The DS-Lite interface 64 may be configured to encapsulate and forward messages for transmission through an Internet Protocol version 6 (IPv6) tunnel to the translation device 86. The DS-Lite interface may be configured to add an IPv6 header to the forwarded message to facilitate delivery within the IPv6 tunnel. This may include addressing the corresponding IPv6 packet for receipt by the translation device 86, which is shown to be an AFTR device. The AFTR device 86 may then decapsulate the IPv6 packet to recover the forwarded message so that the source address of the message may be translated to an available one a pool of public IPv4 addresses associated with the AFTR device 86. The AFTR device 86 may then forward the message over the IPv4 Internet 30 using the public IPv4 addresses as the source address and the un-translated destination address.

The AFTR device 86 may also forward the message to the internal IPv4 network 80 if the destination address is associated with a device 14 connected thereto. The use of the DS-Lite interface 64 to communicate the message to the internally connected device 14 may be desirable in instances where the gateway 24 does not include the private IPv4 interface 62 or while there is some disruption in the use of the private IPv4 interface 64 or its related infrastructure. The use of the private IPv4 interface 62 to forward the message to the internally connected device may be preferable over the DS-Lite interface 64 in order to avoid use of the DS-Lite tunnel and its corresponding infrastructure, particularly the consumption of one of the pool of public IPv4 address associated with the AFTR device 86. The use of the private IPv4 interface 62 may avoid consumption of the AFTR device public addresses since the public IPv4 interface 62 allows the message to be forwarded internally without having to be translated with the AFTR device 86 or the CGN device 84.

The foregoing description of the gateway 24 presumes the message to be forwarded to be formatted according to IPv4. The gateway 24 may also be configured to facilitate forwarding messages formatted according to IPv6. The IPv6 messages may be communicated over the home/customer IPv6 network 76 and an internal IPv6 network 90, which may be part of the network 44, and the IPv6 Internet 30. The internal IPv4 network 90 may be similar to the internal IPv4 network 80 in that it is within the inside portion 54 of the system 10. The IPv6 Internet 30 may be similar to the IPv4 Internet 30 in that it is located outside 56 of the system 10 to correspond with an IPv6 portion of the Internet 30. The native IPv6 interface 66 and the 6RD interface 68 may be used to facilitate IPv6 based message forwarding. These IPv6 interfaces 66, 68 may be included in addition to or in place of one or more of the above described IPv4 interfaces 60, 62, 64.

The native IPv6 interface 66 maybe assigned a public IPv6 address to facilitate messaging over IPv6-based infrastructures. The native IPv6 address may be sufficient to facilitate direct IPv6 communications to a destination without requiring network address translation. The native IPv6 interface 66 may be configured to translate the source address of the message to be forwarded to the public IPv6 address and to maintain the destination address. The message may then be forwarded, in either of an upstream or downstream direction, between the IPv6 home network 76 and/or an internal IPv6 network 90 and/or the IPv6 Internet 30 depending on whether the destination address corresponds with a device connected to the internal IPv6 network or the IPv6 Internet. Because the messages forwarded through the native IPv6 interface 66 do not require network address translation by a transition device, it may be preferable to rely upon the native IPv6 interface 66 when available.

The 6RD interface 68 may be an alternative interface to the native IPv6 interface 66 in some environments where it may be desirable to rely upon a tunnel to facilitate communications with a translation device 94. The 6RD interface 68 may be configured to encapsulate and forward messages for transmission through an IPv4 tunnel to the translation device 94. The 6RD interface 68 may be configured to add an IPv4 header to the forwarded message to facilitate delivery within the IPv4 tunnel. This may include addressing the corresponding IPv4 packet for receipt by the translation device 94, which may be a 6RD device. The 6RD device 94 may then decapsulate the IPv4 packet to recover the forwarded message so that the source address of the message may be translated to an available one a pool of public IPv6 addresses associated with the 6RD device 94. The 6RD device 94 may then forward the message over the IPv6 Internet 30 using the public IPv6 addresses as the source address and the un-translated destination address.

Figure 3:
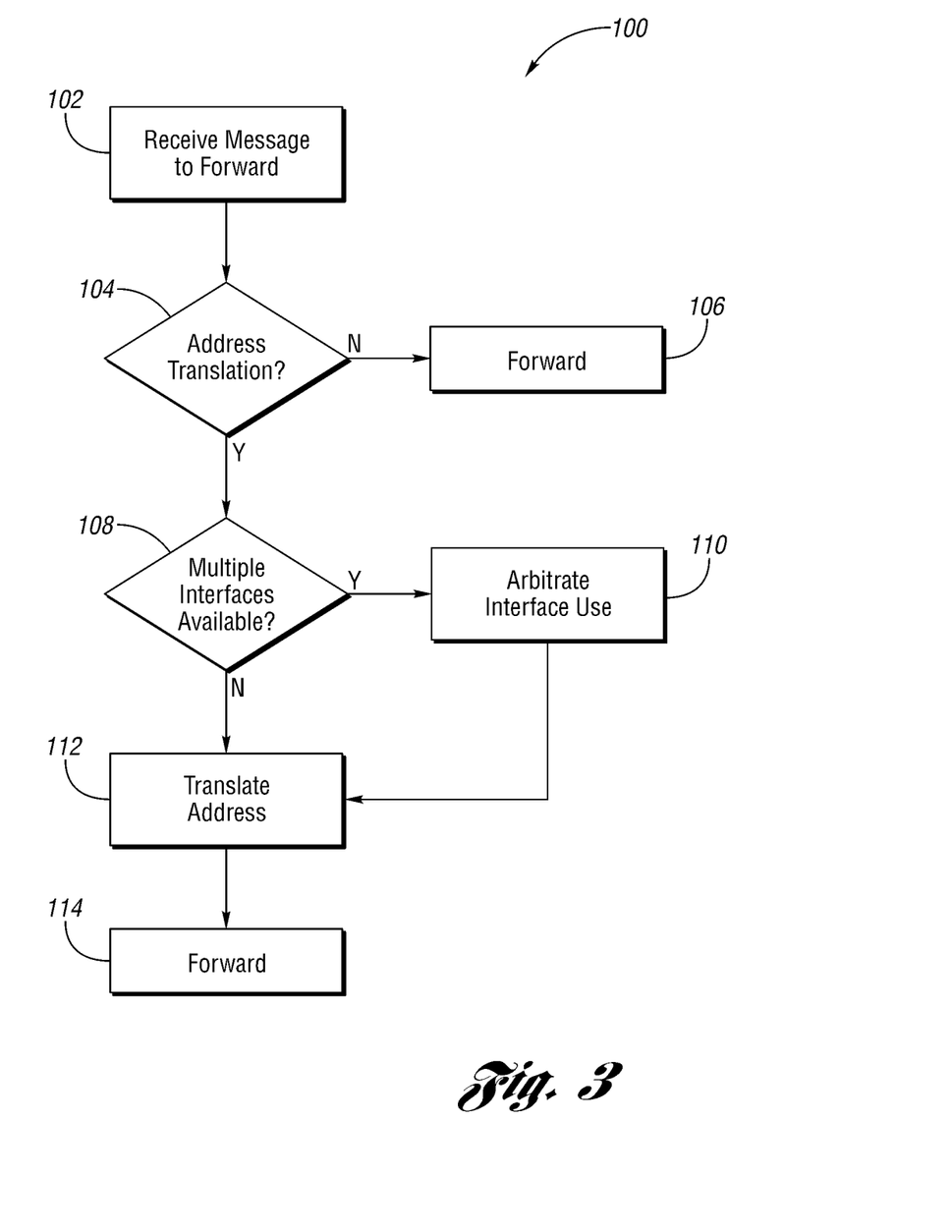
FIG. 3 illustrates a flowchart of a method of arbitrating use of interfaces as contemplated by one non-limiting aspect of the present invention.

The gateway 24 contemplated by the present invention may be configured with the interfaces 60, 62, 64, 66, 68 described above. The controller 72 may be configured with a corresponding algorithm 96, 98 or other executable system to facilitate arbitrating use of one or more the interfaces 60, 62, 64, 66, 68. FIG. 3 illustrates a flowchart 100 of a method of arbitrating use of the interfaces 60, 62, 64, 66, 68 as contemplated by one non-limiting aspect of the present invention. The controller 72 may include a processor (not shown), computer-readable medium (not shown) and/or other features necessary to facilitate the operations contemplated herein. The computer-readable medium may include instructions or other executable commands operable with the processor to facilitate controlling the gateway 24 to facilitate the message forwarding operations described below in more detail.

Block 102 relates to the gateway 24 receiving a message for forwarding. The message may be received from the first device 12, second device 14, and/or third device 16 or some other device connected to the corresponding one of the network 44 and the Internet 30 or to one of the first and second internal networks 20, 22. The method is predominately described with respect to the message being received at the gateway 24 from the first device 12 where the source address corresponds is an inside address (private) of the device 12 and the destination address is associated with one of the second and third devices 14, 16 such that the message is considered to be flowing in an upstream direction. This is done without intending to unnecessarily limit the scope and contemplation of the present invention as the present invention fully contemplates executing and coordinating corresponding processes with respect to messages flowing in a downstream or opposite direction, i.e., from one of the second and third devices 14, 16 to the first device 12.

Block 104 relates to determining whether the message requires address translation. This determination may be based on whether one of the public IPv4 interface 60 or the native IPv6 interface 66 is available to forward the message. The public IPv4 interface 60 and the native IPv6 interface 66 may be assigned an outside address that requires no further address translation prior to being delivered to the destination address. Block 106 relates to forwarding the message using the available one of the public IPv4 interface 60 and the native IPv6 interface 66. This message forwarding may include the gateway 24 replacing the source address of the incoming message with the corresponding public IPv4/IPv6 address assigned thereto and then facilitating delivery of the message to the specified destination address without any further translation or change to the source address. In the event a response is received to the forwarded message, the gateway 24 may forward the related response message by changing an included destination address to the address of the first device 12.

Block 108 relates to the incoming message requiring network address translation. The message may be determined to require network address translation in the event the source address requires further manipulation, replacement, or change after being forwarded from the gateway 24, i.e., by one of the translation devices 84, 86 noted above. Block 108 relates to identifying whether multiple interfaces 60, 62, 64, 66, 68 are available to facilitate forwarding the message to an appropriate one of the translation devices 84, 86. This may occur, for example, if both of the private IPv4 interface 66 and the DS-Lite interface 64 are available to forward the message or the gateway 24 is otherwise configured with additional interfaces and/or redundant interfaces (multiple copies of the same interface).

Block 110 relates arbitrating use of one of the plurality of available interfaces 60, 62, 64, 66, 68 to forward the message. The arbitration process may be performed by the controller 72 or some other device within communication of the gateway 24, e.g., a network administrative type of device. The arbitration process may include performing a connection test. The connection test may be used to determining whether a connection can be established between each of the interfaces 60, 62, 64, 66, 68 and the corresponding translation device 84, 86 and/or between each translation device 84, 86 and the device associated with the destination address. The connection test may be beneficial when multiple interfaces 60, 62, 64, 66, 68 have been determined to be available without checking the communication medium. For example, the multiple interfaces 60, 62, 64, 66, 68 may be determined to be available simply from data associated with the incoming message, such as data identifying the message as being compatible with more than one of the available interfaces 60, 62, 64, 66, 68. The present invention contemplates a scenario where multiple interfaces 60, 62, 64, 66, 68 are determined to be available upon receipt of the message to be forwarded and then subsequently determined not be available after completion of the connection test.

The arbitration process may also include performing a performance test. The performance test may be used to test for a better performing one of the available interfaces 60, 62, 64, 66, 68 and/or connection medium used by available interfaces 60, 62, 64, 66, 68. The better performing one of the interfaces 60, 62, 64, 66, 68 may correspond with the interface associated with the faster communication speed, the better reliability, the better quality of service, the lower cost per bit transferred, etc. The performance test may optionally be performed after the connection test in order to insure only interfaces 60, 62, 64, 66, 68 passing the connection test are subjected to the performance test. This selective application of the performance test may be beneficially in ameliorating unnecessary testing, e.g., when one of the connections has failed the connection test, and/or to speed processing in the event the connection test can be performed more quickly than the performance test.

In addition to or in place of the dynamic arbitration associated with the connection test performance tests, the arbitration process may include a more static arbitration assessment. The static assignment assessment may include selecting one of the available interfaces 60, 62, 64, 66, 68 according to a look-up table or other association defined prior to receipt of the message for forwarding. This may include the gateway 24 or some other device in communication therewith, including the device 12 originating the message to be forwarded, cross-referencing an identifier (e.g., source address, destination address, flag, etc. included within the message) to a preselected one of the interfaces 60, 62, 64, 66, 68. Once the available one of the interfaces 60, 62, 64, 66, 68 has been chosen according to the arbitration process, Block 112 relates to forwarding the message to a corresponding translation device 84, 86.

The translation device 84, 86 may correspond with the selected one of the interfaces 60, 62, 64, 66, 68. The selected interface 60, 62, 64, 66, 68 may be configured to facilitate forwarding the message to the translation device according to the associated protocol/format, e.g., through the DS-Lite tunnel or through another mechanism (CGN delivery mechanism). Block 114 relates to the translation device 84, 86 performing the necessary translation and then forwarding the message to the destination address. This message forwarding may include the translation device replacing the source address of the incoming message with the corresponding public IPv4/IPv6 address assigned thereto and then facilitating delivery of the message to the specified destination address without any further translation or change to the source address. In the event a response is received to the forwarded message, the previously used translation device may forward a response message by changing a corresponding destination address to the address of the gateway, which may then change the destination address again to that of the first device.

As supported above, one non-limiting aspect of the present invention contemplates providing a solution for avoiding tunneling and NAT operations for on-net IPv4 services i.e., message forwarding without use of the CGN and/or IPv4/IPv6 tunnel. Dual Stack Lite is a way to provide IPv4 connectivity to end devices in an IPv6 only MSO network. Dual-Stack Lite encapsulates IPv4 traffic at a customer B4 device and transports it through an IPv6 tunnel to a service provider AFTR, which decapsulates and translates the traffic. There may be circumstances where an operator wants to roll out DS-Lite now (as part of their CGN strategy), ahead of turning off IPv4 on their network infrastructure. Since in this case IPv4 traffic volumes will likely still be higher than IPv6, it likely makes sense to allow on-net IPv4 traffic to bypass the DS-Lite infrastructure and be routed natively.

One non-limiting aspect of the present invention contemplates, instead of using the typical random addresses behind each DS-Lite B4, use of unique "private" addresses for each host on the network (or within each region), and use of at least three logical WAN interfaces on the home router containing the B4: native IPv6, native IPv4, 6RD tunnel, and IPv4-in-IPv6 softwire (DS-Lite tunnel).

One non-limiting aspect of the present invention contemplates configuring the home router/gateway (e.g. an eRouter getting its configuration file from the CMTS, or a CPE router via DHCP prefix list) with the appropriate static routes to arbitrate use of available gateway interfaces. This may include all IPv6 exiting via the native IPv6 interface being directed to the IPv6 PE/GW (default::/0 route); all Internet bound IPv4 traffic exiting via the IPv4-in-IPv6 softwire and be tunneled to the AFTR for NAT, etc (default 0/0 route); and/or all local (on-network) traffic avoiding the AFTR, e.g., by installing specific on-net IPv4 routes that can be reached by exiting the native IPv4 interface and directed to the IPv4 PE/GW (specific routes for each on-net prefix).

One non-limiting aspect of the present invention contemplates a first and highest priority rule that native interfaces with public addressing are always preferred such that if a native IPv4/IPv6 interface with a public address exists on the device, it should be used for all IPv4/IPv6 forwarding. In the case of IPv4, if there is no native IPv4 interface with a public address, the selection of an interface to use falls to several methods. When deciding between a native IPv4 interface with a private address and a DS-Lite tunnel interface, all of the following methods are acceptable (either alone or in combination) as methods to select the interface to use: Connection testing (similar to the method described in "Happy Eyeballs"), performance testing (such as STUN), IP routing (static or dynamic), manual configuration (local config or via a DHCP flag), or with signaling from a protocol like ICE or ICE-Lite. When deciding between multiple DS-Lite tunnel interfaces, a subset of these methods can be used: "H.E.", routing, DHCP, ICE. In the case of IPv6, when there is no native IPv6 interface but there are multiple 6RD tunnel interfaces, a subset of the algorithms listed for IPv4 interface selection can be used: "H.E.", routing, ICE, or a DHCP inform message.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A gateway configured to facilitate network transmission of upstream messages sourced from one or more devices connected to a home network when addressed to devices connected to one of an internal network and the Internet, the messages being sourced with a destination address and a source address, the gateway comprising:

a private Internet Protocol (IPv4) interface having a private IPv4 address, the private IPv4 interface translating the source address of upstream messages forwarded therethrough to the private IPv4 address, the private IPv4 address being sufficient to forward messages directly over the internal network but not directly to the Internet such that upstream messages being forwarded to the Internet require network address translation of the corresponding source address with a network address translator (NAT), the NAT having a pool of public IPv4 addresses and being configured for translating the private IPv4 address to one of the public addresses IPv4 addresses available within the pool prior to forwarding messages to the Internet;

a public IPv4 interface having a public IPv4 address, the public IPv4 interface translating the source address of upstream messages forwarded therethrough to the public IPv4 address, the public IPv4 address being sufficient to forward messages directly over the Internet such that messages being forwarded to the Internet require no further translation of the corresponding source address;

a Dual Stack Lite (DS-Lite) interface configured to encapsulate and forward messages for transmission through an Internet Protocol version 6 (IPv6) tunnel to an AFTR device, the AFTR device having a pool of public IPv4 addresses and being configured for translating the source address of messages received through the IPv6 tunnel to one of the public IPv4 addresses available within the pool prior to forwarding to the Internet;

a native IPv6 interface having a public IPv6 address, the native IPv6 interface translating the source address of upstream messages forwarded therethrough to the public IPv6 address, the public IPv6 address being sufficient to forward messages directly over the Internet such that messages being forwarded to the Internet require no further translation of the corresponding source address;

a 6RD interface configured to encapsulate and forward messages for transmission through an IPv4 tunnel to a 6RD device, the 6RD device having a pool of public IPv6 addresses and being configured for translating the source address of upstream messages forwarded through the IPv4 tunnel to one of the public IPv6 addresses available within the pool prior to forwarding to the Internet;

a controller configured with a look-up table or other association sufficient to select use of one of the private IPv4, public IPv4, DS-Lite native IPv6 and 6RD interfaces for each message as function of the destination address associated therewith;

wherein the controller is configured to prioritize use of the private IPv4 interface over the public IPv4 and DS-Lite interfaces in the event the destination address corresponds with a destination on the internal network;

wherein the controller is configured to arbitrate between use of the public IPv4 and DS-Lite interfaces in the event the destination address corresponds with an IPv4 destination on the Internet;

wherein the controller conducts a connection test to assess whether sufficient connections are available for one or both of the public IPv4 and DS-Lite interface to forward messages, and in the event only one of the public IPv4 and DS-Lite interface is available, to select the one available one of the public IPv4 and DS-Lite interface to use in forwarding messages; and wherein the controller conducts a performance test to assess a better performing one of the public IPv4 and DS-Lite interfaces in the event sufficient connections are available for both of the public IPv4 and DS-Lite interfaces to forward messages, the controller selecting the better performing one of the public IPv4 and DS-Lite interface to use in forwarding messages.

2. A gateway configured to facilitate network transmission of messages sourced from one or more devices connected to a home network to devices connected to an internal network and the Internet, the messages being sourced with a destination address and a source address, the source and destination addresses being one of an Internet Protocol version 4 (IPv4) and version 6 (IPv6) address, the gateway comprising:

a public IPv4 interface having a public IPv4 address, the public IPv4 interface translating the source address of messages forwarded therethrough to the public IPv4 address, the public IPv4 address being sufficient to facilitate delivery of messages over the internal network and the Internet without further translation of the public IPv4 address;

a private IPv4 interface having a private IPv4 address, the private IPv4 interface translating the source address of messages forwarded therethrough to the private IPv4 address, the private IPv4 address being sufficient to forward messages directly over the internal network but not directly to the Internet such that messages being forwarded to the Internet require network address translation with a network address translator (NAT), the NAT having a pool of public IPv4 addresses and being configured for translating the private IPv4 address to one of the public addresses IPv4 addresses available within the pool prior to forwarding messages to the Internet; and a Dual Stack Lite (DS-Lite) interface configured to encapsulate and forward messages for transmission through an Internet Protocol version 6 (IPv6) tunnel to an Address Family Transition Router (AFTR) device, the AFTR device having a pool of public IPv4 addresses and being configured for decapsulating and translating the source address of messages received through the IPv6 tunnel to one of the public IPv4 addresses available within the pool prior to forwarding to the Internet;

a native IPv6 interface having a public IPv6 address, the native IPv6 interface translating the source address of messages forwarded therethrough to the public IPv6 address, the public IPv6 address being sufficient to facilitate delivery of messages over the internal network and the Internet without further translation of the public IPv6 address;

a 6RD interface configured to encapsulate and forward messages for transmission through an IPv4 tunnel to a 6RD device, the 6RD device having a pool of public IPv6 addresses and being configured for translating the source address of messages received through the IPv4 tunnel to one of the public IPv6 addresses available within the pool prior to forwarding to the Internet; and a controller having a look-up table or other association sufficient to select use of the public IPv4 interface, private IPv4 interface, DS-Lite interface, native IPv6 interface and 6RD interface for forwarding messages, the look-up table or other association being configured to select:

i) use of one of the public IPv4 and DS-Lite interfaces for each message sourced with IPv4 source addresses for delivery to the Internet, including selecting a better performing one of the public IPv4 and DS-Lite interfaces when both of the public IPv4 and DS-Lite interfaces are suitable for forwarding the messages; and ii) use of one of the native IPv6 and 6RD interfaces for each message sourced with IPv6 addresses for delivery to the Internet, including selecting a better performing one of the public IPv6 and 6RD interfaces when both of the public IPv6 and 6RD interfaces are suitable for forwarding the messages.

3. A non-transitory computer-readable medium having a plurality of non-transitory instructions operable to facilitate managing a gateway configure to route messages according to Internet Protocol (IP) version 4 (IPv4) and IP version 6 (IPv6) between an inside system and an outside system, the inside system routing messages according to private IPv4 addresses assigned to devices associated therewith, the outside system routing messages according to private and public IPv4 address assigned to devices associated therewith, the non-transitory computer-readable medium having non-transitory instructions sufficient for:

determining source address and destination address for messages intended for routing from the gateway to the outside system;

routing the messages having an inside IPv4 destination to an inside IPv4 network of the inside system, including translating using a private IPv4 interface the source addresses of the corresponding messages to an inside IPv4 address assigned to the gateway, the inside IPv4 addressing being insufficient for addressing the corresponding messages for transmission over the inside network; and routing the messages having an outside IPv4 destination to one of an outside IPv4 network and an IPv6 network of the outside system for subsequent delivery to the Internet, including:

i) when routing to the outside IPv4 network, translating the corresponding messages using one of a Dual Stack Lite (DS-Lite) interface and a public IPv4 interface for delivery to the Internet, the DS-Lite interface configured to encapsulate and forward the corresponding messages for transmission through an Internet Protocol version 6 (IPv6) tunnel to an Address Family Transition Router (AFTR) device, the AFTR device having a pool of public IPv4 addresses and being configured for decapsulating and translating the source address of the corresponding messages received through the IPv6 tunnel to one of the public IPv4 addresses available within the pool for delivery to the Internet, the public IPv4 interface configured for translating the source addresses of the corresponding messages to one of a plurality of outside IPv4 addresses included in a pool of outside IPv4 addresses assigned to the gateway for delivery to the Internet; and ii) when routing to the outside IPv6 network, translating the corresponding message using one of a 6RD interface and a native IPv6 interface, the 6RD interface encapsulating and forwarding the corresponding messages for transmission through an IPv4 tunnel to a 6RD device, the 6RD device having a pool of public IPv6 addresses and being configured for translating the source address of messages received through the IPv4 tunnel to one of the public IPv6 addresses available within the pool for delivery to the Internet, the native IPv6 interface translating the source address of the corresponding messages forwarded to a public IPv6 address assigned thereto;

selecting use of the public IPv4 interface, private IPv4 interface, DS-Lite interface, native IPv6 interface and 6RD interface for forwarding messages according to look-up table or other association, including selecting:

i) use of one of the public IPv4 and DS-Lite interfaces for each message routing to the outside IPv4 network according to a better performing one of the public IPv4 and DS-Lite interfaces when both of the public IPv4 and DS-Lite interfaces are suitable for translating the corresponding messages; and ii) use of one of the native IPv6 and 6RD interfaces for each message routing to the outside IPv6 network according to a better performing one of the native IPv6 and 6RD interfaces when both of the native IPv6 and 6RD interfaces are suitable for translating the corresponding messages.

* * * * *